United States Patent [19]
Becher et al.

[11] Patent Number: 4,911,498
[45] Date of Patent: Mar. 27, 1990

[54] INFANT SEAT SUN VISOR

[76] Inventors: Anthony H. Becher; Michelle E. Becher, both of 3224 Cherokee Ave., Santa Rosa, Calif. 95403

[21] Appl. No.: 361,448

[22] Filed: Jun. 5, 1989

[51] Int. Cl.[4] ............................................. A47C 7/10
[52] U.S. Cl. .................................... 297/184; 297/254
[58] Field of Search ............... 297/184, 254, 255, 256, 297/191; 350/331 R

[56] References Cited

U.S. PATENT DOCUMENTS

| | | | |
|---|---|---|---|
| 2,530,900 | 11/1950 | Nelson, Jr. | 297/254 |
| 4,027,915 | 6/1977 | Anderson et al. | 297/184 |
| 4,030,748 | 6/1977 | Brock | 297/184 |
| 4,293,162 | 10/1981 | Pap et al. | |
| 4,583,779 | 4/1986 | Myers. | |
| 4,583,780 | 4/1986 | Finn | 297/184 |
| 4,641,922 | 2/1987 | Jacob | 350/331 R |
| 4,733,906 | 3/1988 | Davis et al. | |
| 4,807,927 | 2/1989 | Livich | 297/184 |
| 4,813,739 | 3/1989 | Miller | 297/184 |

*Primary Examiner*—James T. McCall
*Attorney, Agent, or Firm*—Leon Gilden

[57] ABSTRACT

An infant seat sun visor apparatus is set forth wherein a mounting yoke is secured in overlying relationship to an existing infant seat with a forward "U" shaped pivotally mounted sun visor pivotally mountable relative to the mounting yoke by a plurality of spring clamps formed with interacting serrated teeth to angularly position the visor relative to the yoke, as desired. The yoke is provided with a downwardly depending "T" shaped abutment member positionable rearwardly of the seat including a plurality of interiorly positioned friction pads to frictionally maintain the apparatus in position relative to the infant seat. Protective resilient molding is formed about the edges of the pivotally mounted visor to enhance protection of an infant. The sun visor apparatus of the instant invention enables the infant to be shaded from sun's rays while simultaneously limiting obstruction of vision of the infant. The sun visor of the instant invention is formed of translucent polymeric material and may optionally include photochromic qualities to adjust the light imposing on an infant's eyes in relation to the intensity of light imposed upon the visor.

1 Claim, 1 Drawing Sheet

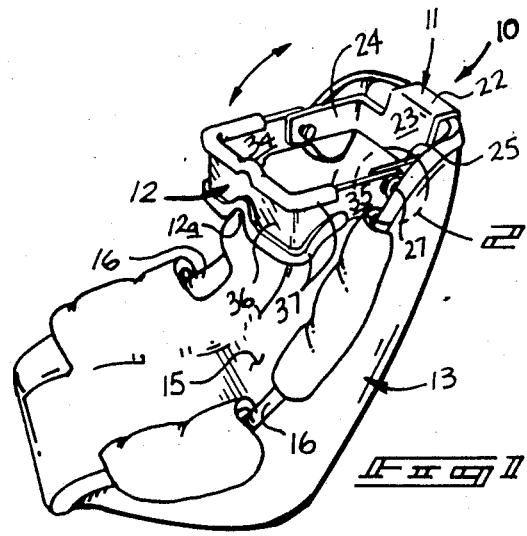
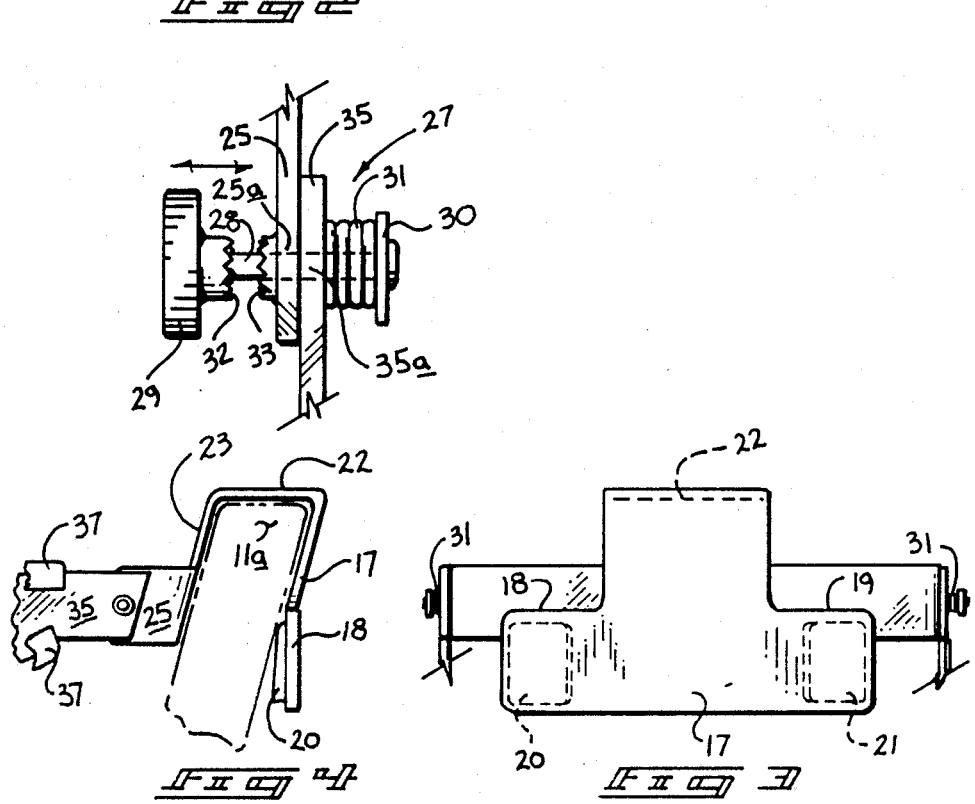

INFANT SEAT SUN VISOR

BACKGROUND OF THE INVENTION

1. Field of the Invention

The field of invention relates to infant sun shading apparatus, and more particularly pertains to a new and improved infant seat sun visor apparatus wherein the same may be readily securable to an existing infant seat and positionable relative to an infant within that seat, as desired.

2. Description of the Prior Art

The use of infant sun shading devices of various types and organizations have been set forth in the prior art. The prior devices have typically involved expansive organizations that have been cumbersome in use, or alternatively have been of limited effectiveness in the providing of sun shading about an infant's eyes and simultaneously allowing unobstructed vision and air circulation about the infant. For example, U.S. Pat. No. 4,027,915 to Anderson sets forth a transparent canopy-type shield for securement in association with an infant seat. The continuous transparent canopy arrangement of the Anderson patent creates limited air flow about the infant and is of limited use in the shading of the infant as the entire canopy is transparent, as opposed to the translucent and photochromic qualities of the instant invention.

U.S. Pat. No. 4,293,162 to Pap, et al., sets forth an infant sun shade wherein the shade provides an opaque canopy vertically and horizontally adjustable, as well as angularly orientable to the existing infant seat. The Pap patent fails to provide the air circulation and shading to the infant's eyes, as opposed to the instant invention.

U.S. Pat. No. 4,583,779 to Myers sets forth an infant sun shade including a sheet-like canopy securable utilizing a multi-link and tether suspension for securement of the opaque shade about the infant. The sun shade of the Myers patent is an organization relatively remote to that of the instant invention.

U.S. Pat. No. 4,583,780 to Finn sets forth an infant sun screen wherein a plurality of opposed clamps is securable to opposed sides of the infant seat, as opposed to the instant invention that is of a slip-fit universal type securement enabling a wider range of application and enhanced ease of use. Further, the Finn patent lacks the photochromic structure of the instant invention.

U.S. Pat. No. 4,733,906 to Davis, et al., sets forth an infant seat sun shade utilizing a plurality of side mounted spring fingers to secure the shade to an existing seat.

As such, it may be appreciated that there is a continuing need for a new and improved infant seat sun visor wherein the same includes the characteristics enabling ease of use and effectiveness of construction, and in this respect, the instant invention substantially fulfills this need.

SUMMARY OF THE INVENTION

In view of the foregoing disadvantages inherent in the known types of infant sun shading devices now present in the prior art, the present invention provides an infant sun visor wherein the same may be readily secured to an existing infant seat including a pivotally mounted visor that may be readily adjusted relative to an infant utilizing the seat. As such, the general purpose of the present invention, which will be described subsequently in greater detail, is to provide a new and improved infant seat sun visor which has all the advantages of the prior art infant sun shading devices and none of the disadvantages.

To attain this, the present invention comprises a mounting yoke formed with a rearwardly positioned "T" shaped abutment member each of planar configuration with confronting surfaces resiliently biased towards one another with a connecting web secured between uppermost portions of the forward flange and "T" shaped member to overlie an upper edge of an infant seat including a pivotally mounted visor utilizing a spring clamp positioned between each rearwardly extending leg of the sun visor and securable to forwardly depending "L" shaped legs integrally formed to the forward flange.

My invention resides not in any one of these features per se, but rather in the particular combination of all of them herein disclosed and claimed and it is distinguished from the prior art in this particular combination of all of its structures for the functions specified.

There has thus been outlined rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved infant seat sun visor which has all the advantages of the prior art infant sun shades and none of the disadvantages.

It is another object of the present invention to provide a new and improved infant seat sun visor which may be easily and efficiently manufactured and marketed.

It is a further object of the present invention to provide a new and improved infant seat sun visor which is of a durable and reliable construction.

An even further object of the present invention is to provide a new and improved infant seat sun visor which is susceptible of a low cost of manufacture with regard to both materials and labor, and which accordingly is then susceptible of low prices of sale to the consuming public, thereby making such infant seat sun visors economically available to the buying public.

Still yet another object of the present invention is to provide a new and improved infant seat sun visor which provides in the apparatuses and methods of the prior art some of the advantages thereof, while simultaneously overcoming some of the disadvantages normally associated therewith.

Still another object of the present invention is to provide a new and improved infant seat sun visor wherein the same may be readily and easily secured to an existing infant seat with a pivotally mounted forward visor formed of photochromic and translucent material accommodating an infant positioned within the seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic top view of the instant invention, somewhat expanded, of section 2, as illustrated in FIG. 1.

FIG. 3 is a rear orthographic view taken in elevation of the instant invention.

FIG. 4 is a side orthographic view taken in elevation of the instant invention.

DESCRIPTION OF THE PREFERRED EMBODIMENT

With reference now to the drawings, and in particular to FIGS. 1 to 4 thereof, a new and improved infant seat sun visor embodying the principles and concepts of the present invention and generally designated by the reference numeral 10 will be described.

More specifically, it will be noted that the infant seat sun visor 10 essentially comprises a mounting yoke 11 defining a gap 11a for overlying the upper edge of defined by the rear surface 14 and the padded seat portion 15 of an infant support seat 13. The yoke is dimensioned to be positioned and interfit between the side wall 16 of the support seat 13. The yoke is formed of a downwardly oriented "T" shaped abutment member 17 formed with outwardly extending left and right legs 18 and 19 respectively. The left and right legs include a first and second friction pad 20 and 21 on an interior surface thereof in confronting relationship with the rear surface 14 of the baby seat to enhance the stability and orientation of the yoke in positioning about the seat. The left and right legs 18 and 19 of the yoke are oriented orthogonally relative to the central portion of the "T" shaped abutment member 17.

A connecting web 22 is formed to an uppermost terminal end of the "T" shaped abutment member 17 to orient the "T" shaped abutment member downwardly of the connecting web 22 at one end of the connecting web 22 with a downwardly extending forward flange 23 extending downwardly at the other end of the connecting web 22 wherein the "T" shaped abutment member 17 and the forward flange 23 are aligned with confronting surfaces to define the gap 11a to accept the upper edge of the support seat 13 therebetween. Further, the abutment member 17 and the forward flange 23 are resiliently biased towards one another and inclined towards one another to enhance engagement with the seat 13. A first and second "L" shaped leg 24 and 25 extend outwardly relative to the forward flange 23 wherein the "L" shaped legs extend first parallel to and then orthogonally forward of the forward flange 23 to orient the outer legs of the "L" shaped legs 24 and 25 parallel to one another relative to the connecting legs that are joined to the forward flange 23. The outer legs of the "L" shaped legs 24 and 25 include a through-extending aperture 24a to receive a through-extending shaft 28 of each of the first and second spring clamps 26 and 27. Reference to FIG. 2 is illustrative of the first spring clamp 26 which is in construction identical to the second spring clamp 27. The forward ends of the "L" shaped legs 24 and 25 pivotally mount the "U" shaped visor 12 thereto. The visor 12 is formed with first and second side legs 34 and 35 with a medially positioned forward surface 36. The side legs 34 and 35, as well as the forward surface 36, are formed of polymeric translucent material and may optionally be of photochromic construction to enable the visor 12 to accommodate various intensities of light imposed onto the visor. The rear terminal ends of the first and second side legs 34 and 35 are each formed with outwardly extending second serrated teeth 33 for cooperation with first serrated teeth 32 which are integrally and telescopingly positionable relative to the second serrated teeth and are formed at a lowermost end of a resilient padded grasp knob 29. The grasp knob 29 is secured to a forward end of the through-extending shaft 28 which extends through the aperture 24a of a first "L" shaped leg 24, as well as through an aligned aperture formed axially of the second serrated teeth 33. The other end of the shaft 28 includes a circular abutment flange 30 integrally formed thereto to capture a coil spring 31 between the flange 30 and the first "L" shaped leg 24. In this manner upon manual grasping and reciprocation of the knob 29, the first side leg 34 of the "U" shaped visor 12 is disengaged and upon a similar release action being effected to the second spring clamp 27 (which is identical in construction to the first spring clamp 26), the visor 12 may be pivotally adjusted relative to the mounting yoke 11. The upper and lower edges of the forward translucent surface 36 of the visor 12 are formed with a resilient edge molding 37 to minimize inadvertent impact between the visor 12 and an infant positionable within the seat 13.

It should be noted that the visor 12 is formed with a nose recess 12 directed upwardly and medially of the lower edge molding 37 to enhance appearance and acceptance of the visor by parents of an infant to promote usage of the instant invention. Further, it should be noted that the "L" shaped legs 24 and 25 are of a relatively wide defined height to effect protection of an infant's ears due to the proximity of the "L" shaped legs 24 and 25 to that portion of an infant's anatomy.

As to the manner of usage and operation of the instant invention, the same should be apparent from the above description and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An infant seat sun visor apparatus selectively securable to an upper edge of an infant seat, said apparatus comprising,
   a mounting yoke including a planar connecting web with a downwardly extending abutment member formed to a rear edge of said connecting web, and
   a downwardly extending forward flange formed to a forward edge of said connecting web, and
   said forward flange including first and second arms formed to opposed side edges of said forward flange, and
   a "U" shaped visor including rearwardly extending first and second legs mounted to the respective first and second arms of the forward flange, and
   wherein said downwardly extending abutment member is of a generally inverted "T" shaped configuration with the outwardly extending legs of the "T" shaped configuration including resilient friction pads for frictional securement and alignment with the infant seat, and
   wherein the forward flange is of a generally planar configuration and wherein the forward flange and the abutment member are resiliently biased towards one another with planar faces of the abutment member and forward flange in confronting relationship to one another to resiliently grasp the infant seat therebetween, and
   wherein the first and second arms formed to the forward flange are of a generally "L" shaped configuration wherein the "L" shaped configuration includes rear legs joined parallel to the forward flange and extending outwardly thereof with a forward leg formed to each "L" shaped arm oriented orthogonally relative to the forward flange, and
   wherein each forward leg of the first and second arms include resilient clamps to resiliently and selectively engage the rearwardly extending respective first and second legs of the "U" shaped visor to the forward legs of the "L" shaped arms, and
   wherein each spring clamp includes a padded knob integrally secured to an axle extending through a respective first and second leg and a respective forward leg of a respective first and second arm and
   wherein the knob includes a series of serrated teeth formed about the axle and engageable with further serrated teeth formed on a respective rearwardly extending first and second leg of the "U" shaped visor to latch the "U" shaped visor relative to the forward legs of the first and second arms, and
   wherein the axle further includes a spring captured between a forward leg of a respective first and second arm and a rigid flange secured to a rearwardmost end of an axle of a respective spring clamp, and
   wherein the pivotally mounted visor is formed of translucent material, and
   wherein the pivotally mounted visor is further formed of photochromic material, and
   wherein the pivotally mounted visor includes upper and lower edges and wherein the upper and lower edges have formed thereto resilient edge molding to minimize impact of the visor with in infant positioned within the seat.

* * * * *